Sept. 21, 1943.   T. H. BRIGGS ET AL   2,329,871
SCREW-THREAD MECHANISM AND PARTICULARLY VEHICLE STEERING MECHANISM
Filed Aug. 5, 1942

Inventors
T.H.Briggs
W.H.Briggs
By Hancock Downing Seebold
Attys.

Patented Sept. 21, 1943

2,329,871

UNITED STATES PATENT OFFICE 2,329,871

SCREW-THREAD MECHANISM, AND PARTICULARLY VEHICLE STEERING MECHANISM

Thomas Henry Briggs and Walter Henry Briggs, Birmingham, England, assignors to Burman & Sons Limited, Birmingham, England Application August 5, 1942, Serial No. 453,750
In Great Britain October 14, 1941

1 Claim. (Cl. 74—499)

This invention relates to screw-thread mechanisms and particularly vehicle steering mechanisms of the kind in which a half-nut is arranged in slidable connection with a screw and in which the nut is connected by a lever to a mechanism to be actuated by the screw.

The object of the invention is to enable the nut to be effectively supported against the action of forces tending to twist or otherwise deflect it from its proper relation to the screw, and at the same time enable the engagement of the nut and screw to be conveniently adjusted.

The invention comprises a mechanism of the kind aforesaid in which the nut is both slidably and pivotally supported by a guide member arranged parallel with the axis of the screw.

Figure 1:
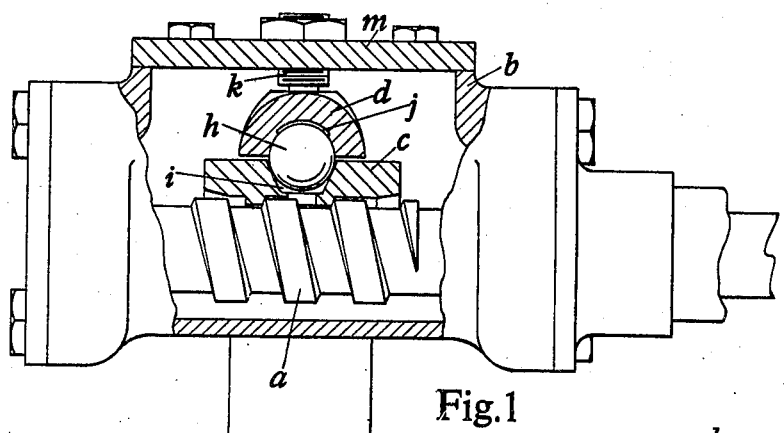
Figure 2:
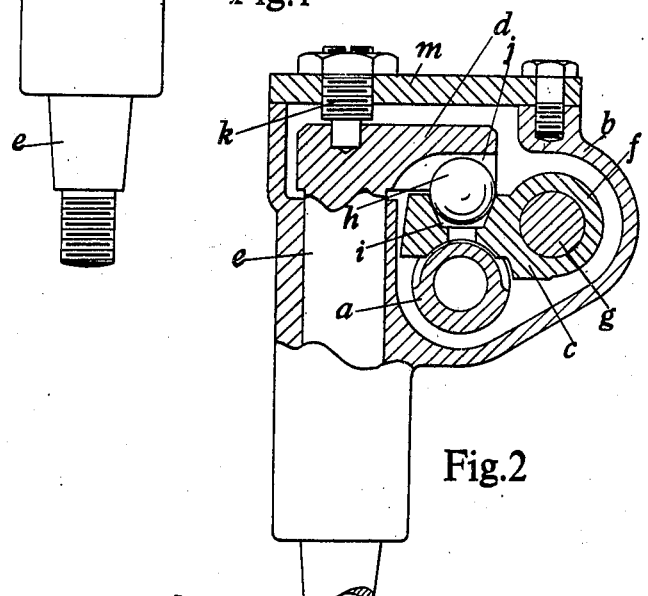
Figure 3:
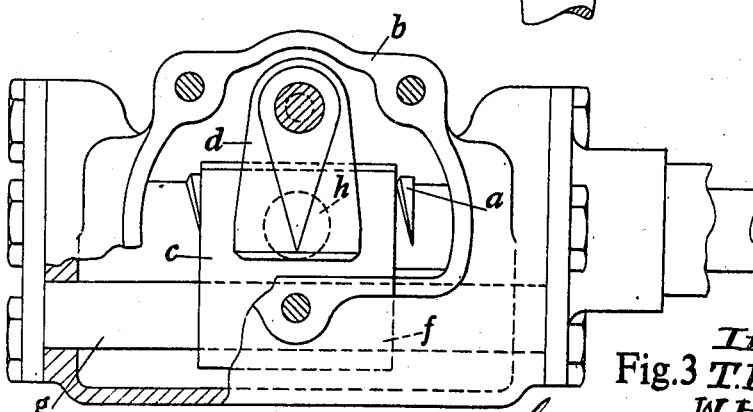

In the accompanying sheet of explanatory drawings:

Figures 1 and 2 are part sectional elevations taken at right angles to each other, and Figure 3 is a part sectional plan, of a screw-thread mechanism constructed in accordance with the invention and adapted to form part of a vehicle steering mechanism.

As shown in the drawings, we employ a short screw $a$ which is formed on or adapted to be secured to one end of the vehicle steering shaft in the usual manner, and we mount this screw in any conveniently shaped housing or box $b$, the latter having end bearings for supporting the screw. For engaging one side of the screw $a$ we provide a half-nut $c$ which is slidable along the screw when the latter is rotated, and connected to the outer side of the nut is a lever $d$ formed on or secured to a shaft $e$, the latter being supported by the box $b$ on an axis at right angles to the axis of the screw. The shaft $e$ is adapted to be connected to the steering linkage of the vehicle, in the usual way.

To enable the mechanism above described to be constructed in a compact form it is desirable that the nut $c$ shall be of short length, but as such a nut presents only a small surface to the screw $a$ it is necessary to support it adequately against the action of the forces set up in operation which tend to twist or otherwise deflect the nut relatively to the screw and so set up an undesirable binding action and friction between the nut and screw. Also it is necessary to be able to adjust the nut relatively to the screw, for the elimination of slackness.

In carrying the invention into effect as shown, we form on the half-nut $c$ near one of its ends a boss $f$ of convenient length situated parallel with the axis of the screw $a$, and through this boss we form a cylindrical bore. Also in the box $b$ we secure a guide rod $g$ of cylindrical form, this being arranged parallel with the axis of the screw $a$. The rod $g$ passes through the bore of the nut boss $f$ and the length of the latter is made such as will adequately support the nut $c$ against any movements other than those required. The nut $c$ is caused to slide on the guide rod $g$ by the action of the screw $a$ and the sliding movements are communicated to the adjacent lever $d$ abovementioned through any convenient connection. Preferably and as shown we connect the nut $c$ to the lever $d$ by means of a ball $h$ which occupies a hole or recess $i$ in the nut and a radial groove $j$ in the adjacent face of the lever.

The mode above described of supporting the nut $c$ also permits a pivotal movement of the nut on the guide rod $g$, and this movement permits the required relative adjustment of the nut and the screw $a$ for eliminating slackness between the nut and screw. Such adjustment is conveniently effected by a stud $k$ passing through and in screw thread engagement with a cover plate $m$ closing one side of the box $b$, the stud being arranged to bear axially on the adjacent end of the lever shaft $e$. The pressure exerted by the stud $k$ is transmitted to the nut $c$ through the lever $d$ and ball $h$, thereby causing the nut to be pressed towards the screw $a$, and at the same time eliminating slackness between the ball, nut and lever.

Whilst the invention is primarily intended for use in vehicle steering mechanisms, it is not limited thereto as it may be applied to other analogous screw mechanisms. Further the invention is not limited to the examples above described as subordinate constructional details may be varied.

Having thus described our invention we we claim as new and desire to secure by Letters Patent is:

A screw thread mechanism of the kind specified, comprising in combination a screw, a half-nut in slidable connection with the screw, a guide member on which the nut is both slidably and pivotally supported and which is arranged parallel with the axis of the screw, and a lever mounted on a fixed axis and connected to the nut so that sliding movement of the nut is accompanied by pivotal movement of the lever.

THOMAS HENRY BRIGGS.
WALTER HENRY BRIGGS.